United States Patent [19]
Kotaki

[11] Patent Number: 5,276,659
[45] Date of Patent: Jan. 4, 1994

[54] CLOCK SYNCHRONOUS SYSTEM FOR A NETWORK STATION

[75] Inventor: Koji Kotaki, Tokyo, Japan

[73] Assignee: Kabushiki Kaisha Toshiba, Kawasaki, Japan

[21] Appl. No.: 684,212

[22] Filed: Apr. 12, 1991

[30] Foreign Application Priority Data

Apr. 16, 1990 [JP] Japan ..................... 2-99631

[51] Int. Cl.[5] ............... G04B 47/00; G04C 11/00; G08B 1/00
[52] U.S. Cl. ......................... 368/10; 368/46; 368/187; 364/569; 375/107
[58] Field of Search ............... 368/10, 46, 47, 107–113, 185–187; 364/569; 370/85.15; 375/106, 107

[56] References Cited

U.S. PATENT DOCUMENTS

| | | | |
|---|---|---|---|
| 3,838,221 | 9/1974 | Schmidt et al. | 32/54 |
| 4,636,583 | 1/1987 | Bidell et al. | 178/22.17 |
| 4,663,748 | 5/1987 | Karbowiak et al. | 370/89 |
| 4,939,724 | 7/1990 | Ebersole | 370/85.15 |

FOREIGN PATENT DOCUMENTS 1-64437  3/1989  Japan .

*Primary Examiner*—Vit W. Miska
*Attorney, Agent, or Firm*—Oblon, Spivak, McClelland, Maier & Neustadt

[57] ABSTRACT

A clock synchronous system which secures time synchronization in a network station including a master station and a plurality of slave stations. The system monitors, at all time, a time difference between a reference time of the master station and a present time of the slave station. When the time difference exceeds a predetermined value, the system divides that time difference by a predetermined correction number to find a time correction coefficient and gradually corrects the time difference of the slave station by the time corrections coefficient.

9 Claims, 4 Drawing Sheets

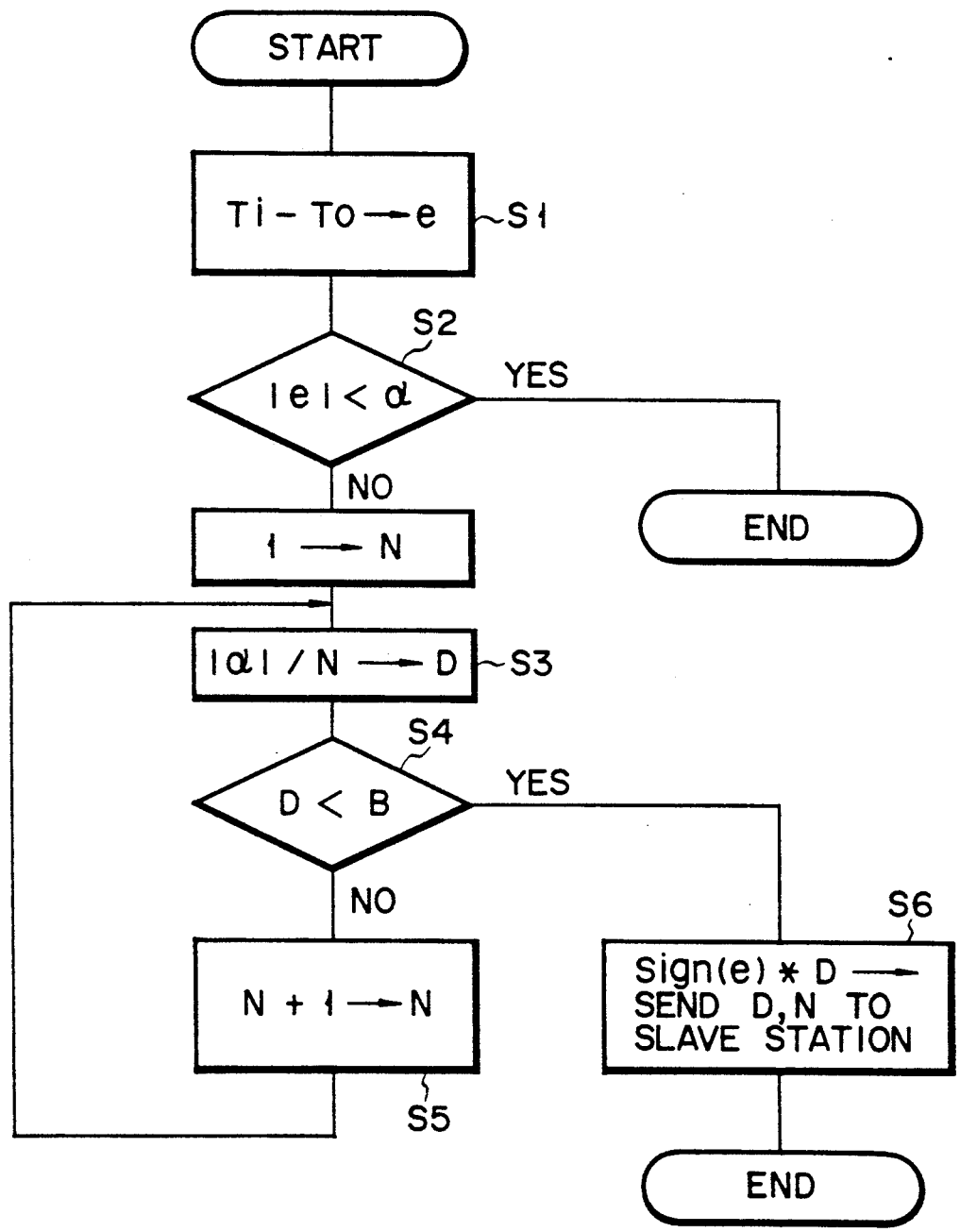
F I G. 4

CLOCK SYNCHRONOUS SYSTEM FOR A NETWORK STATION

BACKGROUND OF THE INVENTION

Field of the Invention

The present invention relates to a clock synchronous system for a network station including a plurality of workstations and applicable to, for example, a distributed processing system and, in particular, to an improved clock synchronous system for a network station in which the internal time of one of a plurality of workstations is used as a reference time and the time of the remaining workstations is synchronized with the reference time.

Description of the Related Art

In a case where a plurality of workstations in a network perform their predetermined processing in accordance with their own function, a problem arises from the way in which the respective workstation time should be synchronized with a common time of a system.

For example, the synchronization of a time between workstations is of great importance to those applications where air-conditioning units are driven or stopped all at a time as in a schedule control system or, after a plurality of workstations perform their data sampling operations simultaneously for each predetermined time as in a data sampling system, the time data difference has to be significantly compared for respective associated workstations.

In a conventional synchronization system of a distributed processing system as disclosed as a timer synchronization system in, for example, Published Unexamined Japanese Patent Application 64-64437, a plurality of workstations are employed with one of them constituting a master station and the remaining stations constituting slave stations where the internal timer's time of the master station is used as a reference time shared by the system.

The system as set out above monitors the synchronization of a time between the master and slave stations and, when the time of the above station is displaced from that of the master station, a time deviation of the slave station from the reference time is corrected all at once. If such correction is made all at once, data is lost by a corrected time portion in a continuous processing by the slave station. For this reason, various problems occur in the data processing of the network station.

SUMMARY OF THE INVENTION

It is accordingly the object of the present invention to provide a clock synchronous system for a network station which can accomplish clock synchronization of associated slave stations on the basis of a reference time of a master station and can be properly applied to, for example, a data sampling processing and a schedule control system.

According to one aspect of the present invention, a clock synchronous system for a network station is provided which monitors, at all times, a time difference between a reference time of a master station and a time of a respective slave station, divides a time difference exceeding a predetermined value by a predetermined correction number to obtain a time correction coefficient, and gradually correct the time difference, by the time correction coefficient, relative to the slave station.

According to another aspect of the present invention, a clock synchronous system for a network station having a plurality of workstations connected to a transmission path with one of them constituting a master station and the remaining workstations constituting slave stations in which the time of the respective slave station is corrected based on a reference time of the master station, comprising:

the master station finding a delay or gain time from time information sent from the slave station for each given time and reference time, finding a time correction coefficient and time correction number of the respective slave station on the basis of the given time and delay or gain time, and transmitting the time correction coefficient and time correction number to the slave station; and the respective slave station, responsive to each timer check signal of its internal timer, for calculating the time correction coefficient and time check signal sent from the master station to obtain a correction timer check signal, comparing a time correction number sent from the master station and its own time correction number, repeating a time correction operation until there occurs a coincidence between the two, and correcting a time difference between a reference time of the master station and an internal time of the respective slave station, a plurality of times, upon receipt of each timer check signal.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 is a flowchart for finding time correction data by the master station;

DETAILED DESCRIPTION OF THE PREFERRED EMBODIMENTS

Figure 1:
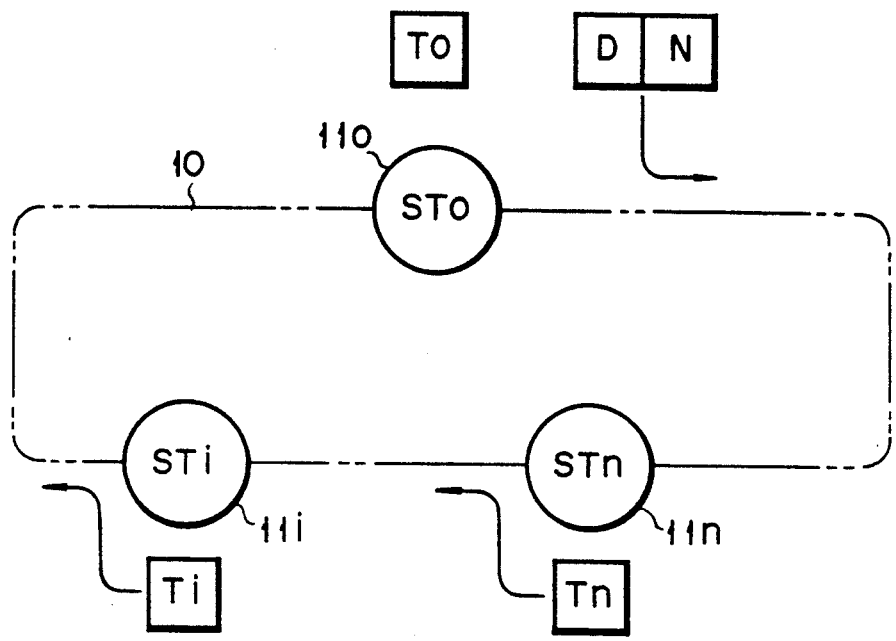
FIG. 1 is a schematic view showing a network station of the present invention.

In a network station shown in FIG. 1, a plurality of workstations $11o, \ldots, 11i, \ldots$ are connected in a loop-like transmission path 10 to provide a networked structure. Of these workstations, for example, the workstation $11o$ constitutes a master station and the other workstations $11b$ (not shown), ... $11i$, ... constitute slave stations.

The stations $11o, \ldots, 11i, \ldots$, measure the time by their internal timer as internal time $To, \ldots, Ti, \ldots$ In this case, the internal time to of the master station $11o$ is set to be a reference time on the basis of which the respective slave stations $11b, \ldots, 11i, \ldots$ secure time synchronization.

The master station 11o receives a text format from the slave station at an optional or a predetermined time and obtains the time correction data of the slave station in accordance with a procedure shown in FIG. 4, the text format being comprised of header information and present time information of, for example, the slave station 11i attached to the header information.

That is, the master station 11o finds a time difference between its own reference time to and a time Ti of, for example, the slave station 11i (step S1) and then determines whether or not the time difference |e| is smaller than a predetermined allowance time α- step S2. If the time difference |e| is smaller than the allowance time α, the master station 11o does not obtain the time correction data of the slave station 11i, ending the series of steps involved. The allowance time α represents the time allowable between the reference time and the present time of the slave station and corresponds to a time unit of a few seconds or a few tens of seconds.

When the time difference |e| is not within the allowance time α, that is, exceeds the allowance time α, the master station 11o sets a time correction number N representing, for example, the number of times time correction is made, divides the allowance time α or the time difference |e| by the time correction number N, and finds a time correction coefficient D—step S3. The master station 11o determines whether or not the time correction coefficient D is below a predetermined correction value β—step S4. When the time correction coefficient is not below the target correction value β, the master station 11o is re-set to the time correction number N+1→N at step S5 and carries out a processing step S3. In this case it is to be noted that the target correction value β is determined by correcting the time difference (|e|) coarsely or finely. If the target correction value β is set to be smaller so that the time difference may be corrected finely, the time correction number N is increased.

Figure 3A:
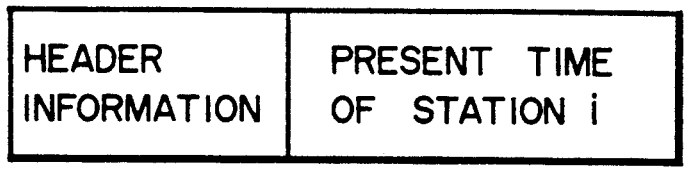
FIGS. 3A and 3B show text formats of a slave station and master station, respectively.
Figure 3B:

When the time correction coefficient D is decreased below the target correction value β at step S4, the master station transmits the text format as shown in FIG. 3D to the corresponding slave station 11i, noting that the text format comprises header information and both internal timer's time correction coefficient D obtained by an operation sign (e) * D→D as shown at step S6 and internal timer's time correction number N attached to the header information. At this time, a system may be adopted according to which a data format, that is, a format containing header information including station identification information and slave station internal timer's time correction coefficient D and internal timer's time correction number N attached to the header information, is transmitted all at a time to the corresponding slave station.

Figure 2:
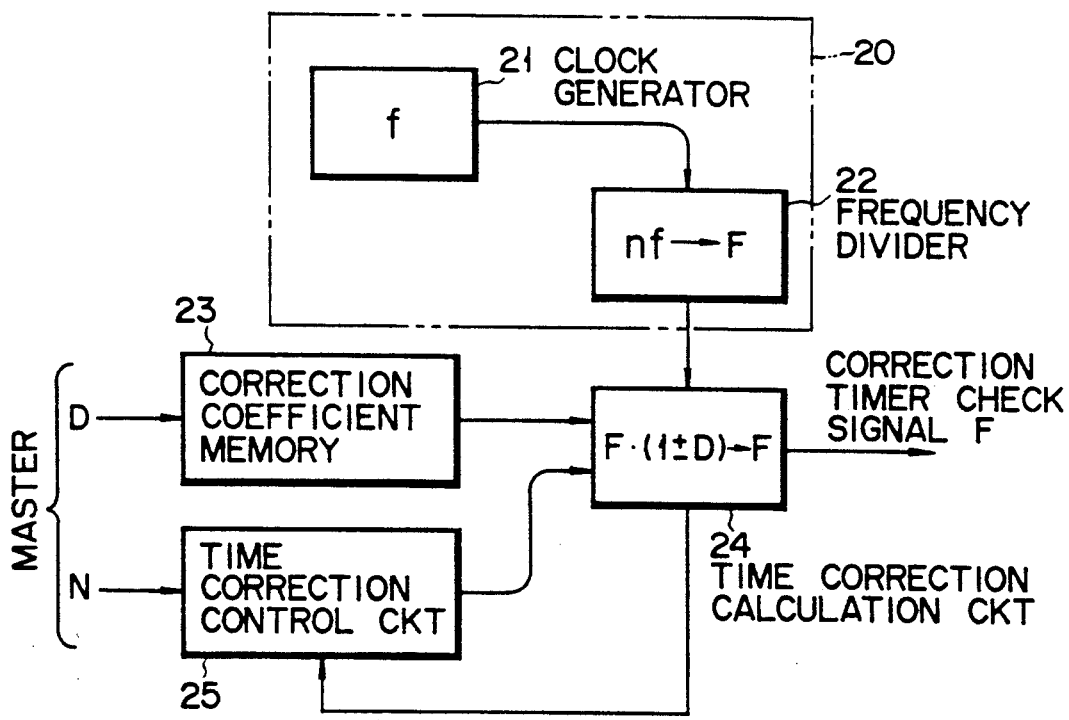
FIG. 2 is a view showing an internal arrangement of a slave station in the network station.

The respective slave station includes an internal timer 20 comprising a clock generator 21 and frequency divider 22 as shown in FIG. 2 and adapted to generate a timer check signal for updating its own internal timer time. The slave station further includes a correction coefficient memory 23 for storing a time correction coefficient D coming from the master station 11o, time correction calculation circuit 24 responsive to each timer check signal coming from the internal timer 20 to find a correction timer check signal F, by the following equation, from the time correction coefficient D as received from the master station 11o and evaluated from a time discrepancy between the slave stations, that is, the time difference |e|, and so on.

$$F \cdot (1 \pm D) \to F$$

A time correction control circuit 24 continues its time correction operation until there is a coincidence between a time correction number N coming from the master station and an actual time correction number of the time correction calculation circuit 24, and terminates the time correction operation upon coincidence therebetween.

Figure 5:
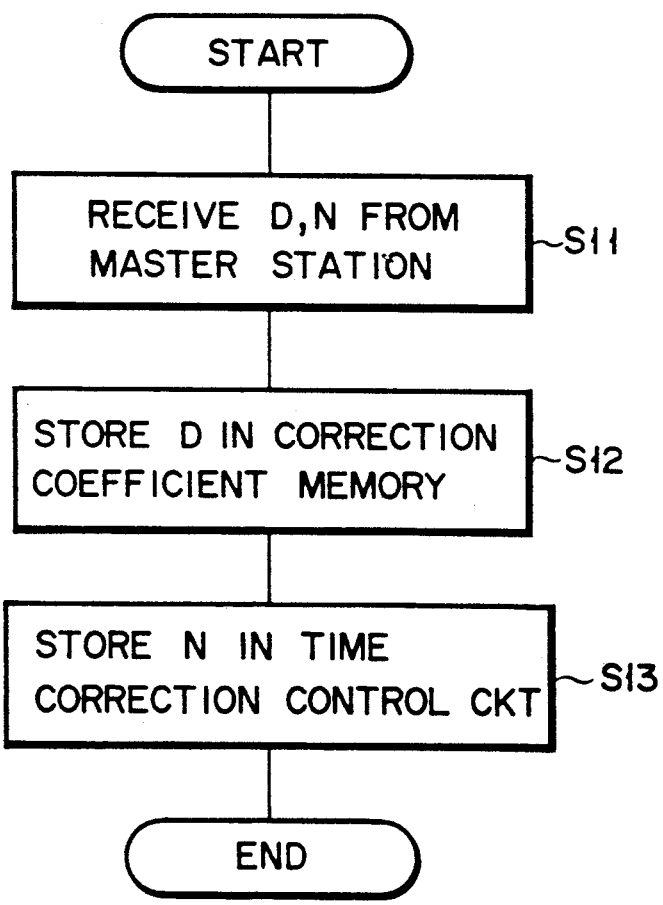
FIG. 5 is a flowchart for explaining a storage order of data in slave stations which is supplied from the master station.

That is, the respective slave station receives the time correction coefficient D and time correction number N from the master station 11o as shown in step S11 (FIG. 5) and allows the time correction coefficient D to be stored in the correction coefficient memory 23 at step S12 and then the time correction number N to be stored in the time correction control circuit 25 at step S13. The time correction calculation circuit 24 is responsive to each timer check signal F to implement a calculation $F \cdot (1 \pm D) \to F$ based on the internal timer check signal F and time calculation until a correction operation terminate signal is received.

Figure 6:
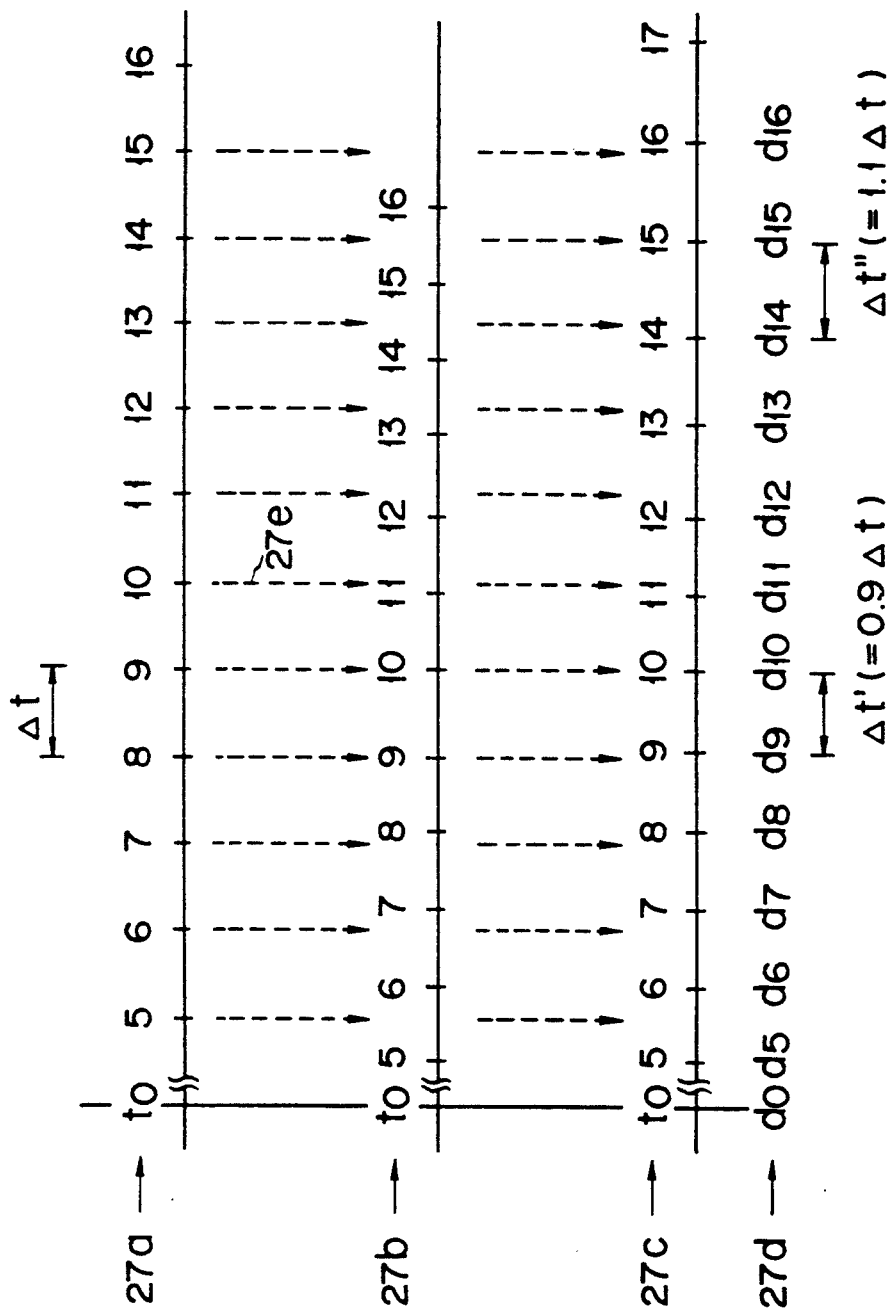
FIG. 6 is a timing sequence for explaining a state of time correction.

In the slave station involved, a time correction operation is carried out in a time sequence as shown in FIG. 6. FIG. 6 shows a master station time sequence 27a, slave station time sequence 27b, slave station correction time sequence 27c and slave station correction data sequence 27d. As evident from the timing sequence, at time to +10Δt in the master station, a time is gained by [1Δt] in the time sequence 27b of the slave station, resulting in a time to +11Δt. At this time, the master station 11o determines a time difference and, in the time correction timing 27e, transmits, for example, time correction coefficient D=0.1 in the correction coefficient memory 23 and time correction number N=10 are stored in the time correction circuit 25. Since the timer check signal from the frequency divider 22 is sent, while being delayed by 10%, in other words, at a time interval of 1.1Δt, to the slave station as the corrected timer check signal until there occurs a coincidence between the time correction number N=10 and the time correction number in the time correction calculation circuit 24, time synchronization can be obtained between the master station and the slave station after 10 system times (for example, 10 samplings) with the time correction timing 27e as a reference point 27e. In this case, a smooth time correction can be accomplished in a step-like time variation ±0.1Δt. Further, time correction is achieved while a time discrepancy is uniformly distributed in the respective slave stations over a longer period of time. In the case where data sampling and schedule control are to be performed simultaneously in the respective slave stations, it is possible to perform an optimal data processing with the use of proper data and hence to secure a proper operation.

Although the aforementioned embodiment has been explained as being applied to a ring-type network, the present invention can be applied to various network structures, for example, to a bus type network. Although the master station uses its internal time as a reference time, any external reference time may be used as a reference time.

According to the present invention as set out above, since the time correction coefficient and time correction number as found based on the time difference of the respective slave station are sent to the slave station, it is possible to perform time correction at the respective slave station upon receipt of time correction data. Further, the respective slave station can secure time synchronization, while very small steplike time correction is being done, enabling a proper processing or a smoother operation to be obtained in various control operations to which the present invention is applied.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. In a network station including a first workstation and a plurality of second workstations connected to a transmission path, a clock synchronous method for synchronizing a time of each of the second workstations with a reference time of the first workstation comprising the steps of:
monitoring a time difference between a reference time of the first workstation and a time of each of the second workstations;
dividing the time difference by a predetermined number corresponding to the number of times by which time correction is made and calculating a time correction coefficient; and
gradually correcting the time difference of each of the second workstations by the time correction coefficient.

2. The clock synchronous method according to claim 1, wherein said monitoring step includes a step of sending a text format from each of the second workstations to the first workstation the text format comprising header information and a present time information indicating a present time of each of the second workstations and attached to the header information; and
a step of calculating a time difference between the reference time of the first workstation and a present time of each of the second stations and said dividing step includes a step of transmitting the time correction coefficient attached to the head information to the corresponding second workstation.

3. A clock synchronous system for a network station including a first workstation and a plurality of second workstations connected to a transmission path, comprising:
means provided in the first workstation, for monitoring a time difference between a reference time of the first workstation and a time of each of the second workstations;
means provided in the first workstation, for dividing the time difference by a predetermined number corresponding to the number of times by which time correction is made, to obtain a time correction coefficient; and
means provided in each of the second workstation, for gradually correcting the time difference of each of the second workstations by the time correction coefficient.

4. The clock synchronous system according to claim 3, wherein said monitoring means includes means for receiving a text format sent from each of the second workstations to the first workstation, the text format comprising header information and a present time information indicating a present time of each of the second workstations and attached to the header information, and means for calculating a time difference between the reference time of the first workstation and the present time of each of the second workstations, and means for transmitting the time correction coefficient to the corresponding second workstation.

5. The clock synchronous system according to claim 3, wherein said correcting means provided in each of the second workstation comprises an internal timer constituted by a clock generator and frequency divider and adapted to update its own internal timer time, a correction coefficient memory for storing a time correction coefficient coming from the first workstation, and a time correction calculation circuit responsive to each timer check signal from the internal timer for calculating a corrected timer check signal from the time correction coefficient and delivering it as an output.

6. The clock synchronous system according to claim 3, wherein said correcting means has a time correction control circuit for comparing the time correction number sent from the first workstation with an actual time correction number, and said time correction calculation circuit continues its time correction operation until a coincidence occurs between the two, and terminates the time correction operation in response to a signal output from said time correction control circuit when that coincidence occurs.

7. The clock synchronous system according to claim 8, wherein said correcting means includes means for storing the time correction coefficient and time correction number sent from the first workstation, internal timer means for generating an internal timer check signal, and means for obtaining a corrected timer check signal from the internal timer check signal and the time correction coefficient for each reception of the timer check signal.

8. A clock synchronous system for a network station having a plurality of workstations connected to a transmission path, one of them constituting a master station and the remaining workstations constituting slave stations, wherein
said master station includes means for obtaining a delay or gain time of each of the slave stations from time information sent therefrom for each given time and a reference time, means for obtaining a time correction coefficient and time correction number of the respective slave station from the given time and the delay or gain time, and means for transmitting the time correction coefficient and time correction number to a corresponding one of the slave stations; and
each of said slave stations includes means for gradually correcting the delay or gain time in accordance with the time correction coefficient and time correction number sent from the master station.

9. The system according to claim 6, wherein each of said slave stations includes means for comparing the time correction number sent from the master station with its own time correction number and means for repeating a time correction operation until there occurs a coincidence between the two.

* * * * *